United States Patent
Suzuki

(10) Patent No.: US 8,023,448 B2
(45) Date of Patent: Sep. 20, 2011

(54) PACKET RELAY APPARATUS

(75) Inventor: Shinsuke Suzuki, Yokohama (JP)

(73) Assignee: Alaxala Networks Corporation, Kanagawa (JP)

( * ) Notice: Subject to any disclaimer, the term of this patent is extended or adjusted under 35 U.S.C. 154(b) by 837 days.

(21) Appl. No.: 11/946,591

(22) Filed: Nov. 28, 2007

(65) Prior Publication Data

US 2008/0175240 A1  Jul. 24, 2008

(30) Foreign Application Priority Data

Jan. 22, 2007  (JP) .................................. 2007-010953

(51) Int. Cl.
*H04L 12/56* (2006.01)
*H04B 7/14* (2006.01)
(52) U.S. Cl. ........................................ 370/315; 370/390
(58) Field of Classification Search .................. 370/310, 370/312, 315, 351, 389, 390, 400; 709/238
See application file for complete search history.

(56) References Cited

U.S. PATENT DOCUMENTS

| | | | |
|---|---|---|---|
| 6,321,270 B1* | 11/2001 | Crawley ........................ | 709/238 |
| 6,611,872 B1* | 8/2003 | McCanne ..................... | 709/238 |
| 6,631,420 B1* | 10/2003 | Li et al. ........................ | 709/242 |
| 6,894,990 B1* | 5/2005 | Agarwal et al. .............. | 370/321 |
| 7,570,635 B2* | 8/2009 | Gotoh et al. .................. | 370/389 |
| 7,573,881 B2* | 8/2009 | Cain et al. .................... | 370/392 |
| 2006/0147204 A1* | 7/2006 | Yasukawa et al. ............. | 398/26 |
| 2006/0176804 A1* | 8/2006 | Shibata ......................... | 370/217 |
| 2006/0209826 A1* | 9/2006 | Kawamura .................... | 370/390 |
| 2009/0103468 A1* | 4/2009 | Kasapidis .................... | 370/312 |

FOREIGN PATENT DOCUMENTS

| | | |
|---|---|---|
| JP | 2004-179811 | 6/2004 |
| JP | 2006-197470 | 7/2006 |
| JP | 2006-324981 | 11/2006 |

OTHER PUBLICATIONS

"Protocol Independent Multicast-Sparse Mode (PIM-SM): Protocol Specification" RFC: 2362, Jun. 1998.
RFC: 3569 "An Overview of Source-Specific Multicast (SSM)" Jul. 2003.
RCF: 3956 "Embedding the Rendezvous Point (RP) Address in an IPv6 Multicast Address" Nov. 2004.
Cisco IOS IP Multicast Command Reference, Release 12.4T, pp. 179-180.
RFC: 3376 "Internet Group Management Protocol, Version 3" Oct. 2002.
RCF: 4610 " Anycast-RP Using Protocol Independent Multicast (PIM)" Aug. 2006.
RCF:3810 "Multicast Listener Discovery Version 2 (MLDv2) for IPv6", Jun. 2004.
Japanese Office Action in Japanese Patent Application No. 2007-010953, mailed Mar. 22, 2011 (with partial English translation).
"Protocol Independent Multicast-Sparse Mode (PIM-SM): Protocol Specification" RFC: 2362, Jun. 1998.

(Continued)

*Primary Examiner* — Chi H Pham
*Assistant Examiner* — Robert Lopata
(74) *Attorney, Agent, or Firm* — Brundidge & Stanger, P.C.

(57) ABSTRACT

In a first-hop router, a reachability monitor monitors RP (Rendezvous-Point) reachability, and the number of times when a response time is not shorter than a predetermined time is stored in a RP management table. An RP selection process controls not to select RP whose reachability from the first-hop router is not stable, so that PIM Register transmission to an unstable RP is suppressed.

9 Claims, 9 Drawing Sheets

OTHER PUBLICATIONS

RFC: 3569 "An Overview of Source-Specific Multicast (SSM)" Jul. 2003.

RFC: 3956 "Embedding the Rendezvous Point (RP) Address in an IPv6 Multicast Address" Nov. 2004.

Cisco IOS IP Multicast Command Reference, Release 12.4T, pp. 179-180. (2006).

RFC: 3376 "Internet Group Management Protocol, Version 3" Oct. 2002.

RFC: 4610 "Anycast-RP Using Protocol Independent Multicast (PIM)" Aug. 2006.

RFC:3810 "Multicast Listener Discovery Version 2 (MLDv2) for IPv6", Jun. 2004.

* cited by examiner

FIG. 4

| MULTICAST ADDRESS | RP ADDRESS | PRIORITY ORDER | RESPONSE TIME-OVER NUMBER |
|---|---|---|---|
| ff3e:40:2001:db8::/96 | 2001:db8::1 | 0 | 0 |
| ff3e:40:2001:db8:1::/96 | 2001:db8::2 | 0 | 0 |
| ff00::/8 | 2001:db8::9 | 2 | 2 |
| ff3e:40:2001:db8::/96 | 2001:db8::7 | 1 | 0 |
| ff3e:40:2001:db5::/96 | 2001:db8::7 | 1 | 0 |

| | SOURCE ADDRESS | MULTICAST ADDRESS | INPUT SOURCE INTERFACE | OUTPUT INTERFACE |
|---|---|---|---|---|
| | 451 | 452 | 453 | 454 |
| ENTRY 1 | 2001:db8:1::1 | ff3e:40:2001:db8::8000 | LINE 1 | LINE 2, LINE 3 |
| ENTRY 2 | 2001:db8:2::1 | ff3e:40:2001:db8::8001 | LINE 2 | RP |
| ENTRY 3 | 2001:db8:3::1 | ff3e:40:2001:db8:1::8002 | LINE 3 | |

| | SOURCE ADDRESS | MULTICAST ADDRESS | INPUT SOURCE INTERFACE | OUTPUT INTERFACE |
|---|---|---|---|---|
| | 451 | 452 | 453 | 454 |
| ENTRY 1 | 2001:db8:1::1 | ff3e:40:2001:db8::8000 | LINE 1 | LINE 2, LINE 3 |
| ENTRY 2 | 2001:db8:2::1 | ff3e:40:2001:db8::8001 | LINE 2 | RP |
| ENTRY 3 | 2001:db8:3::1 | ff3e:40:2001:db8::8003 | LINE 3 | |
| ENTRY 4 | 2001:db8:4::1 | ff3e:40:2001:db8:1::8004 | LINE 2 | RP |

| | SOURCE ADDRESS | MULTICAST ADDRESS | INPUT SOURCE INTERFACE | OUTPUT INTERFACE |
|---|---|---|---|---|
| | 451 | 452 | 453 | 454 |
| ENTRY 1 | 2001:db8:1::1 | ff3e:40:2001:db8::8000 | LINE 1 | LINE 2, LINE 3 |
| ENTRY 2 | 2001:db8:2::1 | ff3e:40:2001:db8::8001 | LINE 2 | RP |
| ENTRY 3 | 2001:db8:3::1 | ff3e:40:2001:db8::8003 | LINE 3 | |
| ENTRY 4 | 2001:db8:4::1 | ff3e:40:2001:db8:1::8004 | LINE 2 | RP, LINE 5 |

| | SOURCE ADDRESS | MULTICAST ADDRESS | INPUT SOURCE INTERFACE | OUTPUT INTERFACE |
|---|---|---|---|---|
| | 451 | 452 | 453 | 454 |
| ENTRY 1 | 2001:db8:1::1 | ff3e:40:2001:db8::8000 | LINE 1 | LINE 2, LINE 3 |
| ENTRY 2 | 2001:db8:2::1 | ff3e:40:2001:db8::8003 | LINE 2 | RP |
| ENTRY 3 | 2001:db8:3::1 | ff3e:40:2001:db8::8003 | LINE 3 | |
| ENTRY 4 | 2001:db8:4::1 | ff3e:40:2001:db8:1::8004 | LINE 2 | LINE 5 |

PACKET RELAY APPARATUS

INCORPORATION BY REFERENCE

The present application claims priority from Japanese application JP2007-010953 filed on Jan. 22, 2007, the content of which is hereby incorporated by reference into this application.

BACKGROUND OF THE INVENTION

1. Field of the Invention

The present invention relates to multicast relay technologies for the Internet, and more particularly to multicast routing which uses PIM-SM.

2. Description of the Related Art

Multicast is concerned with technologies that one packet is transmitted from a transmission terminal and copied at a proper packet relay apparatus at an intermediate relay position, and that the copied packets are output to a plurality of lines to transmit the packets having the same content to a plurality of reception terminals. Since a packet can be transmitted to a plurality of transmission destinations in a smaller amount than that when a packet is transmitted a plurality of times to a plurality of transmission destinations, multicast is suitable for real time multimedia communications requiring a large traffic capacity typically streaming and video conferences.

In order to transmit a multicast packet only to reception terminals originally determined to receive the packet, a packet relay apparatus is required to select proper lines when the packet is output to a plurality of lines. Usually used as a multicast routing protocol for creating a decision criterion of line selection, is a Protocol Independent Multicast Sparse-Mode (PIM-SM) (refer to Non-patent Document 1: IETF, "Protocol Independent Multicast-Sparse Mode (PIM-SM): Protocol Specification", RFC2362).

In PIM-SM, a packet relay apparatus called a Rendezvous Point (RP) plays a major roll in routing. For multicast communications in PIM-SM, each reception terminal to receive a multicast packet transmits a multicast join request to a last-hop router (a packet relay apparatus for accommodating reception terminals). The last-hop router transmits to RP the multicast join request received from the reception terminal. The multicast join request eventually reaches RP via intermediate packet relay apparatus, and each intermediate packet relay apparatus relayed the multicast join request creates a multicast packet transport path in a direction opposite to the relayed direction. In this manner, transport trees of the multicast packet are configured from RP to the last-hop router.

On the side of a multicast transmission terminal, a multicast packet to be transmitted is first sent to a first-hop router (a packet relay apparatus for accommodating transmission terminals). The first-hop router encapsulates once the received multicast packet into a unicast packet (a PIM Register packet), and transmits it to RP. RP extracts the multicast packet from the received PIM Register packet, and outputs the extracted multicast packet to lines toward the last-hop router, in accordance with the configured transport trees.

However, relaying using the above-described RIM Register packet is difficult to yield a high performance. From this reason, PIM-SM operates to directly relay a multicast packet from the first-hop router to PR, without encapsulation, if a flow rate of PIM Register packets exceeds a predetermined value. More specifically, when a communication amount exceeds a threshold value, RP transmits a PIM Join-Prune packet to the first-hop router to configure multicast packet transport trees from the first-hop router to RP. In addition, RP sends a command (PIM Register-Stop packet) to the first-hop router to stop encapsulation at the first-hop router and realize direct relay of a multicast packet in accordance with the configured transport trees.

If a line between the first-hop router and RP and the first-hop router and RP themselves are unstable, a PIM Register-Stop packet from RP does not reach the first-hop router in some case. In this case, a PIM Register packet transmission process at the first-hop router will not stop, and a CPU load on the first-hop router becomes high. There arises therefore a problem that the initially unstable first-hop router and RP become more unstable because of the CPU load caused by PIM Register packet transmission.

PIM-SM specifications (Non-patent Document 1) solve this problem by using a BootStrap Router (BSR). BSR is a packet relay apparatus which periodically advertises RP information in a network. In accordance with the information supplied from BSR, the first-hop router selects a destination RP of a PIM Register packet. In the unstable network state described above, the RP information from BSR will not reach the first-hop router, and will time out eventually. It is therefore possible to suppress PIM Register packet transmission from the first-hop router to RP.

This problem can also be solved by using Protocol Independent Multicast Source-Specific Multicast (PIM-SSM) (Non-patent Document 2: IETF "An Overview of Source-Specific Multicast (SSM)", RFC3569) which extends the PIM-SM specifications and realizes multicast routing without involvement of RP. On the assumption that a multicast join request from each multicast reception terminal contains an IP address of a multicast transmission terminal in PIM-SSM, the last-hop router transmits the multicast join request directly to the first-hop router to thereby dispense with PIM Register transmission from the first-hop router to RP.

This problem is also solved by controlling a PIM Register transmission rate at the first-hop router, in Cisco Systems (Non-patent Document 3: Cisco Systems, "Cisco IOS IP Multicast Command Reference Release 12.4T", pp. 179-180). By regulating a PIM Register transmission upper limit at the first-hop router, it is possible to prevent an overload of the first-hop router to be caused by a PIM Register packet transmission load.

SUMMARY OF THE INVENTION

An approach using BSR becomes effective only when reachability of the RP information from BSR to the first-hop router becomes unstable for a long time period while the first-hop router learns the RP information from BSR. This approach is not effective for, e.g., Embedded-RP which sets RP statically (Non-patent Document 4: IETF, "Embedding the Rendezvous Point (RP) Address in an IPv6 Multicast Address", RFC3956), and cannot deal with the case wherein reachability only in a uni-direction from the first-hop router to RP becomes unstable. Furthermore, since it takes a time until a time-out of PR information distributed from BSR, a PIM Register transmission load at the first-hop router will not be mitigated until the time-out.

PIM-SSM is technologies for dispensing with PIM Register transmission. However, in order to activate PIM-SSM, it is necessary that terminals, applications and layer-2 switches are compatible with an SSM compatible group join request protocol (IGMPv3: Non-patent Document 5: IETF, "Internet Group Management Protocol, Version 3", RFC3376) and an MLDv2 (Non-patent Document 6: IETF, "Multicast Listener Discovery Version 2 (MLDv2) for IPv6", RFC3810), or that a terminal accommodating layer-3 packet relay apparatus implements an SSM compatible group join request protocol conversion technique (Patent Document 1: JP-A-2004-179811). PIM-SSM cannot be adapted to networks other than a network whose all apparatus implement some of these technologies.

PIM Register transmission rate control is technologies for ensuring that a transmission load on the first-hop router becomes not larger than a predetermined value. However, calculation itself of a PIM Register transmission rate in a PIM process of the packet relay apparatus may become a load on the first-hop router. In addition, if the PIM Register transmission rate is not larger than a predetermined value even in the unstable network state described above, there arises a problem that the PIM Register packet is transmitted.

The present invention has an object of reducing a CPU load on the first-hop router by avoiding the first-hop router from selecting an unstable RP in the PIM-SM network by using a simple and versatile method.

In order to achieve the above object of the present invention, the first-hop router transmits a ping (accessibility confirmation) packet to RP, and RP returns a response packet to the ping packet. If the first-hop router does not receive the response packet a predetermined number of consecutive times, or if a response time is longer than a predetermined time even if the response packet is received, it is assumed that PR does not exist.

When the first-hop router receives a multicast packet from a sender and selects a transmission destination RP of a PIM Register packet, the first-hop router does not select RP assumed by the above process not to exist so that the first-hop router cannot find RP to which the PIM Register is to be sent. A PIM Register transmission load can therefore be suppressed.

A load of calculating a transmission destination RP by a PIM process at the first-hop router can be suppressed by utilizing a negative cache mechanism for forcibly discarding the multicast packet during a predetermined time period if RP does not exist.

According to the present invention, it is possible to reduce a load, on the first-hop router, of a PIM Register packet transmission process itself including encapsulation into a PIM Register packet and a load of requesting a PIM-SM route calculator to execute a PIM Register packet transmission process.

In the present invention, the former load is reduced by preventing the first-hop router from selecting an unstable RP, by using a simple and versatile method.

The latter load is also reduced by utilizing also a multicast packet forcible discard function (negative cache function) while RP does not exist.

Communications can be established continuously even if RP selected by the first-hop router is different from RP selected by the last-hop router, by utilizing also Anycast-RP (refer to Non-patent Document 7: IETF, "Anycast-RP Using Protocol Independent Multicast (PIM)", RFC 4610) which is a sync protocol between RP's.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram showing an example of the format of a RP management table.

FIGS. 10A to 10D are diagrams showing examples of a multicast route table.

DESCRIPTION OF THE EMBODIMENT

Figure 1:
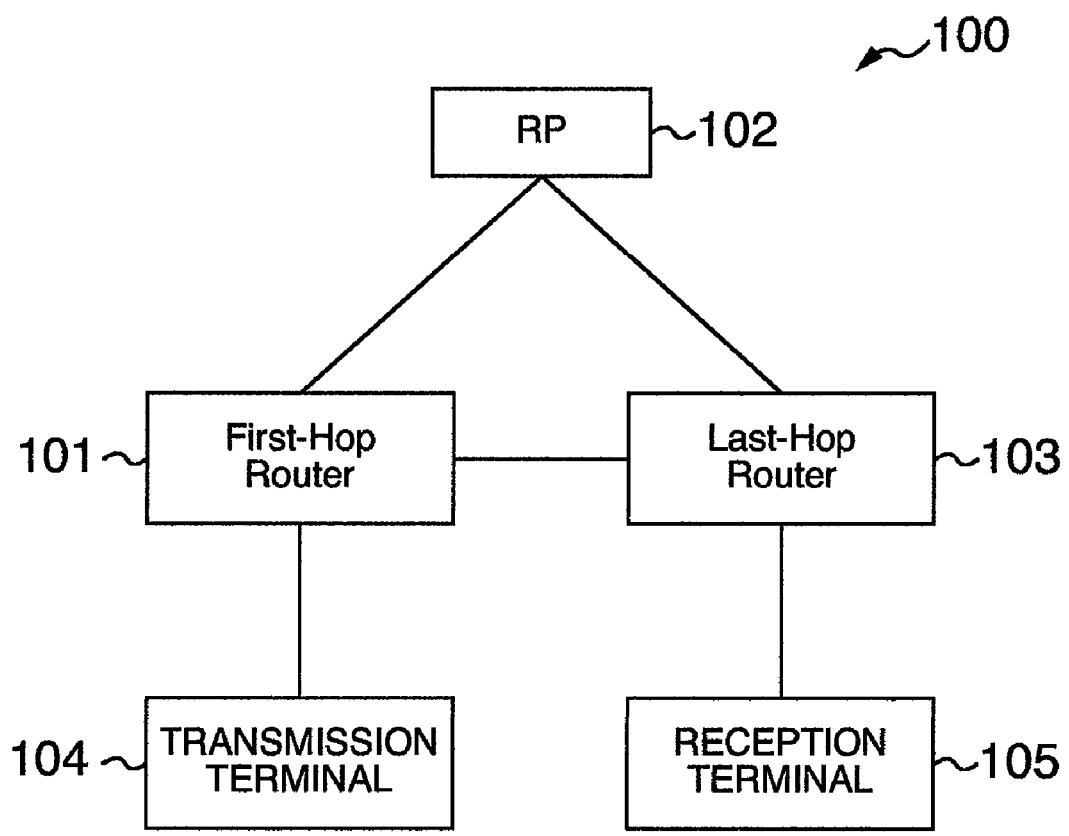
FIG. 1 is a diagram showing an example of the configuration of a PIM-SM multicast network according to an embodiment of the present invention.

FIG. 1 shows an example of the configuration of a PIM-SM multicast network according to an embodiment of the present invention. The PIM-SM multicast network 100 is constituted of PIM-SM routers 101, 102 and 103 and a reception terminal 105. Of the PIM-SM routers, a router for accommodating transmission terminals is a first-hop router 101, and a router for accommodating reception terminals is a last-hop router 103. The Rendezvous Point (RP) router 102 performs multicast relay from the transmission terminal 104 to reception terminal 105 by using a reception process for a PIM Register packet supplied from the first-hop router and a group join request reception process for a group join request supplied from the last-hop router.

Figure 2:
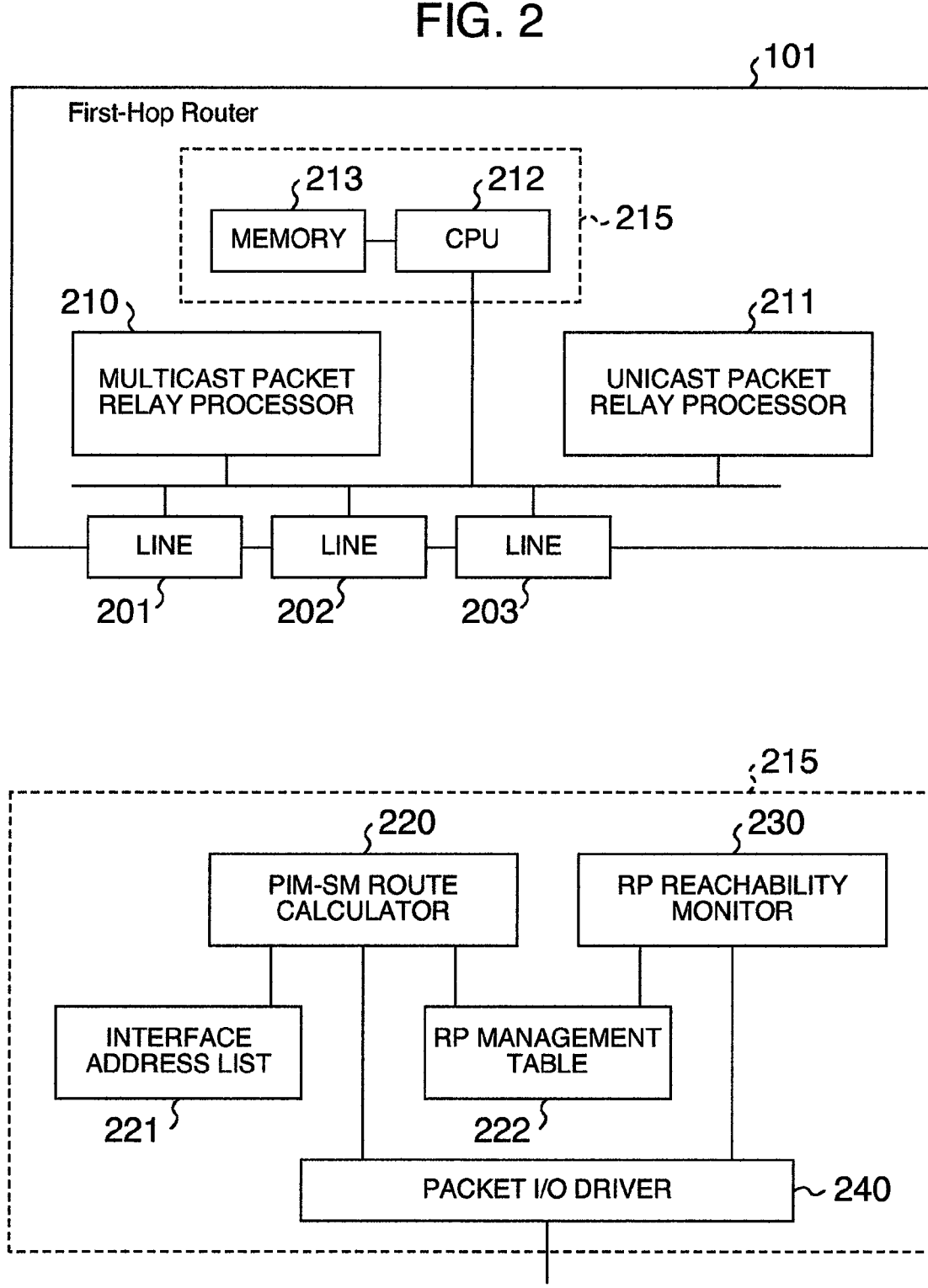
FIG. 2 is a diagram showing the structure of a first-hop router 101.

FIG. 2 is a diagram showing the structure of the first-hop router 101. The first-hop router 101 is an apparatus for performing packet relay among lines 201, 202 and 203. A multicast packet relay processor 210 is a hardware circuit for outputting a multicast packet input from a line to another line, in accordance with a multicast route table. Similarly, a unicast packet relay processor 211 is a hardware circuit for relaying a unicast packet, in accordance with a unicast route table. These route tables of the relay processors 210 and 211 are stored in a memory 213, and managed and updated by a routing program 215 running on a CPU 212.

FIGS. 10A to 10D show examples of a multicast route table. Although the details thereof will be described layer, a multicast route table 450 is constituted of a source address 451, a multicast address 452, an input source interface 453 and an output interface 454, respectively in each entry.

The routing program 215 has: a packet input/output driver 240 for communicating with the multicast packet relay processor 210 and unicast packet relay processor 211; a PIM-SM route calculator 220 for performing a PIM Register packet transmission process including a process of encapsulating a packet input from the packet I/O driver into a PIM Register packet; and an RP reachability monitor 230 for monitoring reachability to RP, as will be described later. The routing program 215 has also an interface address list 221 to be used when judging whether a transmission source of an arriving packet is a terminal directly connected to the router itself, and an RP management table 222 for managing RP addresses corresponding to multicast addresses, the list and table being stored in the memory 213.

When a multicast packet is received from the lines 201 to 203, the multicast packet relay processor 210 checks whether the multicast route table 450 contains a route entry matching a multicast address of the received multicast packet. If a matched route entry exists, the multicast packet relay processor processes based on the contents of the output interface 454. The process contents will be described by taking FIG. 10A as an example. If physical lines are set as in the case of an entry 1, the multicast packet is not encapsulated into a PIM Register packet, but the multicast packet itself is directly output to the output lines indicated in the entry, to thereby perform direct relay. If RP is set to the output interface as in the case of an entry 2, the multicast packet relay processor 210 notifies an arrival of the multicast packet to the PIM-SM route calculator 220 via the packet I/O driver 240. Upon reception of this notice, the PIM-SM route calculator 220 executes a PIM Register packet transmission process including a process of encapsulating the multicast packet into a PIM Register packet. If nothing is set to the output interface as in the case of an entry 3, the multicast packet relay processor 211 does not notify an arrival of the multicast packet to the PIM-SM route calculator 220, but discards the multicast packet.

On the other hand, if a route entry matching the multicast address does not exist in the multicast route table 450, the multicast packet relay processor 210 notifies an arrival of the multicast packet to the PIM-SM route calculator 220 via the packet I/O driver 240. Upon reception of this notice, the PIM-SM route calculator 220 executes a PIM Register packet transmission process including a process of encapsulating the multicast packet into a PIM Register packet.

The multicast packet relay processor 210 judges that PIM Register transmission is necessary, if an entry matching a multicast address of the received multicast packet exists in the multicast route table 450 and RP is set to the output interface, or if an entry matching a multicast address of the received multicast packet does not exist in the multicast route table 450, and notifies an arrival of the multicast packet to the PIM-SM route calculator 220. Thereafter, the PIM-SM route calculator 220 received an arrival notice of the multicast packet executes a PIM Register packet transmission process including a process of encapsulating the multicast packet into a PIM Register packet.

Figure 3:
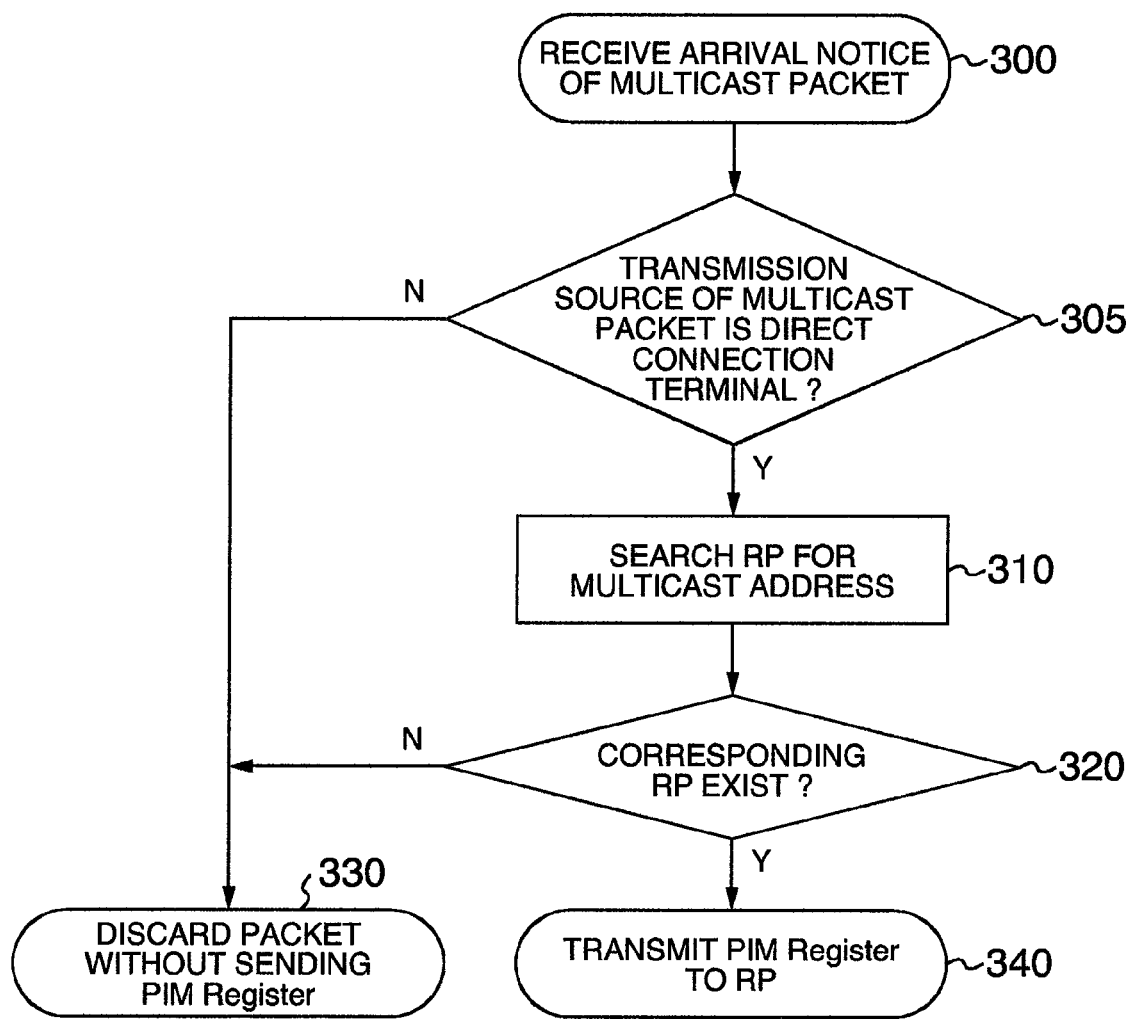
FIG. 3 is a flow chart illustrating a PIM Resister packet transmission process.

FIG. 3 is a flow chart illustrating a PIM Register packet transmission process to be executed by the first-hop router 101. Description will be made on a process to be executed after the multicast packet relay processor 210 judges that PIM Register transmission is necessary, if an entry matching a multicast address of the received multicast packet exists in the multicast route table 450 and RP is set to the output interface, or if an entry matching a multicast address of the received multicast packet does not exist in the multicast route table 450, and notifies an arrival of the multicast packet to the PIM-SM route calculator 220. Upon reception of the notice of multicast packet arrival from the multicast packet relay processor 210 (step 300), the PIM-SM route calculator 220 confirms from the interface address list 221 whether a transmission source of the arriving packet is a terminal directly connected to the router itself (Step 305). If the transmission source of the multicast packet is not the directly connected terminal, the multicast packet is discarded (Step 330). If the transmission source of the multicast packet is the directly connected terminal, the PIM-SM route calculator 220 of the first-hop router 101 searches an RP management table 222 to be described later, by using a multicast address of the multicast packet (Step 310), to confirm whether or not there exists RP corresponding to the multicast address (Step 320). If RP corresponding to the multicast address does not exist, the multicast packet is discarded because there is no transmission destination of a PIM Register packet (Step 330). If RP exists, a corresponding RP address is acquired from the RP management table 222, and the received multicast packet is encapsulated into a PIM Register packet (unicast address) having the acquired RP address as a transmission destination address. The PIM Register packet is unicast-transmitted to RP via the packet I/O driver 240 (Step 340). When the unicast packet is transmitted, the unicast packet relay processor 211 searches an internal route table by using the RP address as the transmission destination address, determines an output line and transmits the unicast packet via the determined output line.

After the PIM Register packet is transmitted, the PIM-SM route calculator 220 adds a route entry to the multicast route table 450, and registers RP as an output line of the packet. If the route entry exists already, this addition is not performed. For example, if the multicast route table 450 has the contents shown in FIG. 10A and a packet is received having a multicast address of "ff3e:40:2001:db8:1::8004", then the PIM-SM route calculator 220 transmits a PIM Register, adds a route entry 4 to the multicast route table 450, and registers RP as an output line (FIG. 10B). When the same packet (packet having the multicast address of "ff3e:40:2001:db8:1::8004") is received from a transmission source, the multicast packet relay processor 210 transmits a PIM Register packet to RP via the PIM-SM route calculator 220 in the same procedure as that described above, in accordance with the output interface 454 of the entry added previously.

When the number of PIM Register packets transmitted from the first-hop router 101 exceeds a predetermined value, a PIM Join-Prune packet and a PIM Register-Stop packet reach the first-hop router 101 from RP. In response to the former PIM Join-Prune packet, a physical line in the RP direction is added as the output interface 454 of the route entry for multicast of the multicast route table 450. For example, a "line 5" as the physical line in the RP direction is added to the output interface 454 of the entry 4 of the multicast route table 450 shown in FIG. 10B (FIG. 10C). In response to the latter PIM Register-Stop packet, RP is deleted from the output interface 454 corresponding to this route entry. For example, RP is deleted from the output interface 454 of the entry 4 of the multicast route table 450 shown in FIG. 10C (FIG. 10D). Since this addition and deletion sets a physical line to the output interface 454 of the multicast route table 450, the PIM Register transmission at the first-hop router 101 stops to effect direct relay of a multicast packet.

Figure 5:
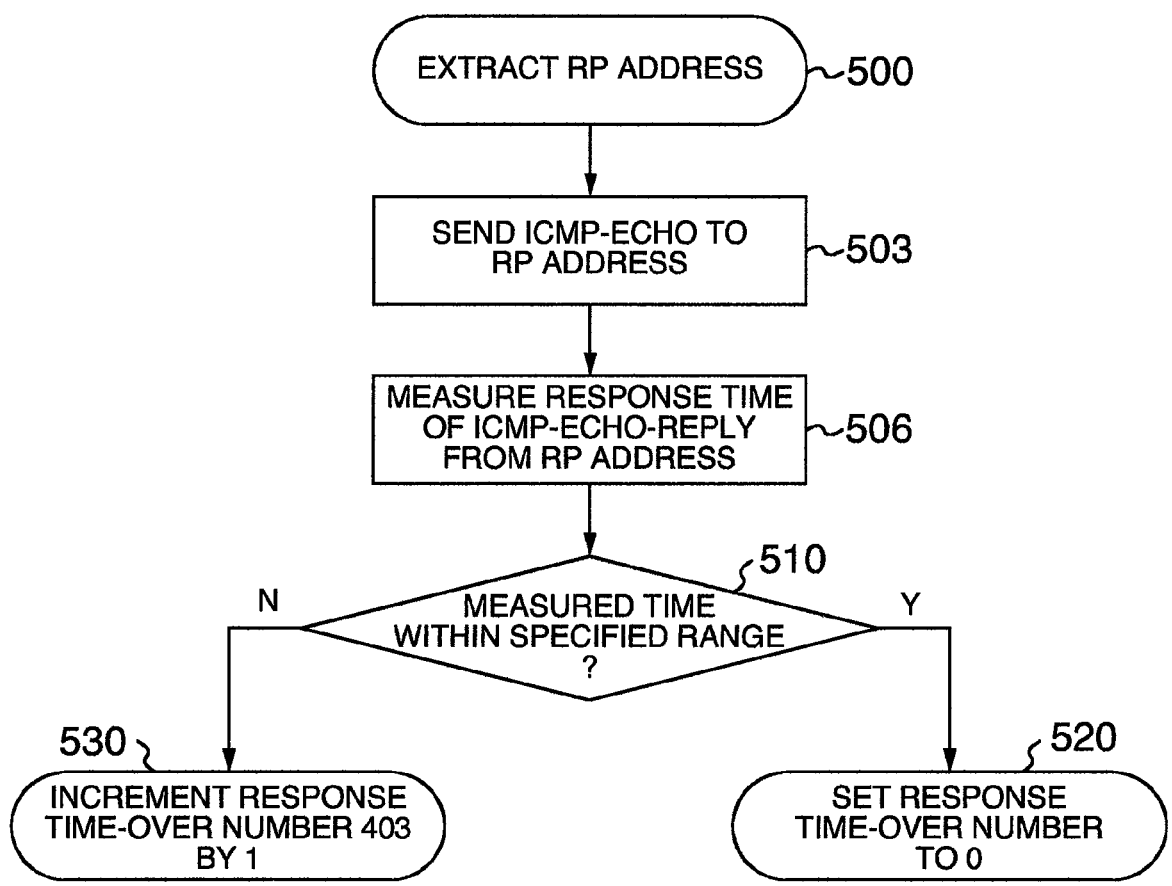
FIG. 5 is a flow chart illustrating a process of monitoring reachability of an RP address.

With reference to FIGS. 4 and 5, description will be made on the RP management table 222 and RP reachability monitor 230 shown in FIG. 2.

As shown in FIG. 4, the RP management table 222 is used for managing a correspondence between a multicast address 401 and an RP address 402. This table stores further for each RP a priority order 403 and a response time-over number 404 for RP reachability confirmation. The priority order 403 and response time-over number 404 are updated by the RP reachability monitor 230.

The RP reachability monitor 230 monitors reachability to an RP address shown in the RP management table 222. Reachability to an RP address is monitored by the process illustrated in the flow chart of FIG. 5. First, the RP reachability monitor 230 extracts an IP address from an RP address field of the RP management table 220 (Step 500), and sends an ICMP ECHO message which is an accessibility confirmation packet, to the IP address (Step 505). The RP reachability monitor 230 measures a response time taken to receive an ECHO-REPLY response (Step 510). If a measured time is within a specified range, the response time-over number 404 corresponding to the RP address in the RP management table 220 is set to "0" (Step 520). If a measured time is out of the specified range (including a case wherein a response is not returned), the response time-over number 404 is incremented by "1" (Step 530). These Steps 500 to 530 are periodically (e.g., once at every one second) executed for all RP addresses stored in the RP management table 450. It is therefore possible to locate an unstable RP. The specified range of a measured time may be changed as desired.

Figure 6:
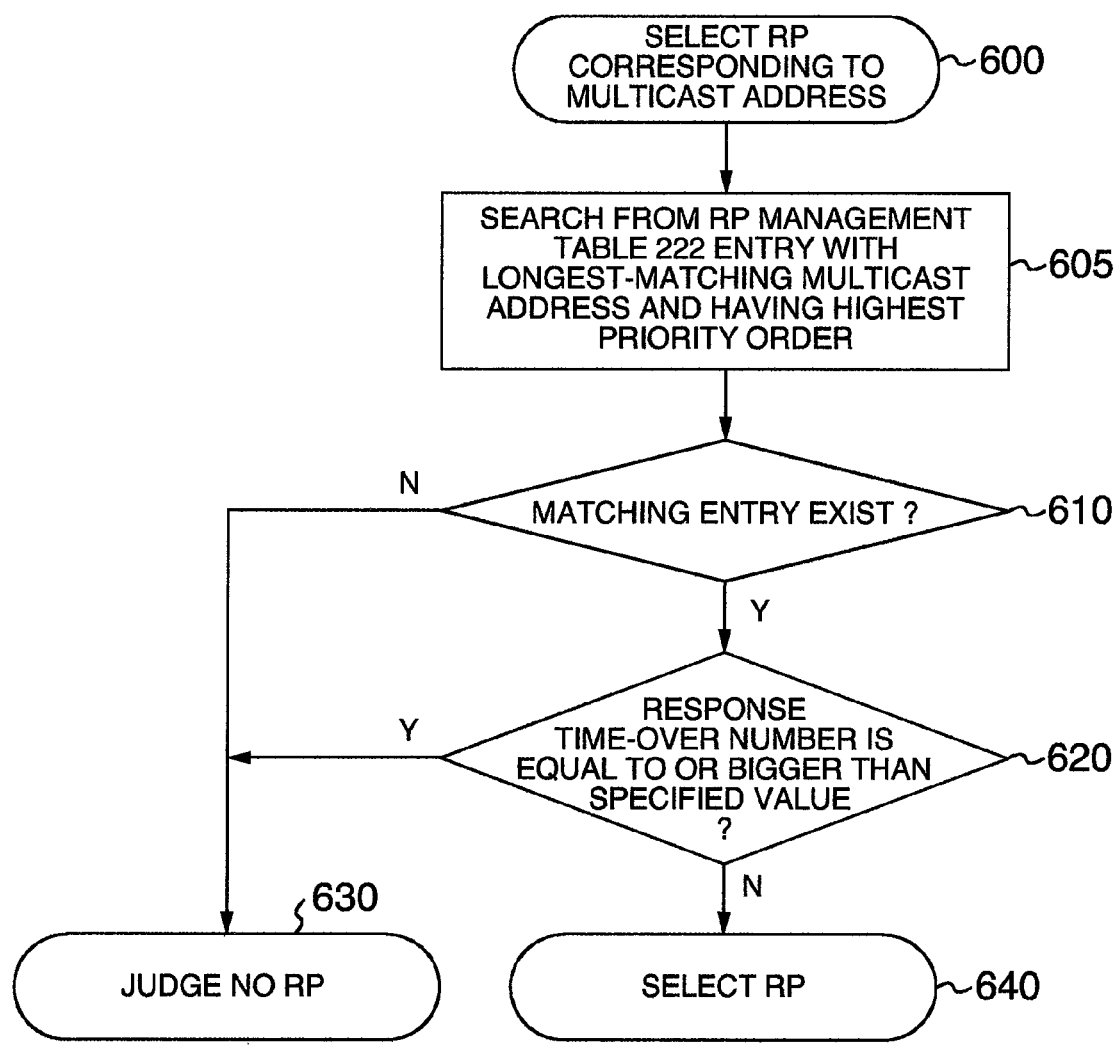
FIG. 6 is a flow chart illustrating a process of selecting an RP.

In accordance with the response time-over number 404 obtained through measurements by the RP reachability monitor 230 and the priority order 403, the PIM-SM route calculator selects RP which is a transmission destination of a PIM Register packet, by executing a process illustrated in the flow chart of FIG. 6. This process is executed when Steps 310 and 320 shown in FIG. 3 confirm whether RP exists corresponding to the multicast address of a received packet. First, the PIM-SM route calculator 220 searches from the RP management table an entry having a multicast address 401 longest-matching the multicast address of a received multicast packet. If there are a plurality of longest-matching entries, an entry having the highest priority order 403 is selected (Step 605). If there is no matching entry (Step 610), it is judged that RP is not found (Step 630). If there is a matching entry (Step 610), the response time-over number 403 of the entry is referred to confirm whether the response time-over number exceeds a specified value (Step 620). If the number does not exceed the specific value, it is judged that this RP is a target RP (Step 640), whereas if the number exceeds the specific value, it is considered to have no RP (Step 630). As described with reference to FIG. 3, if it is judged that a corresponding RP exists, a PIM Register packet is transmitted to this RP (Step 340), whereas if it is judged that a corresponding RP does not exist, the received packet is discarded. In this manner, it becomes possible not to transmit a RIM Register packet to an unstable RP having the response time-over number 404 in excess of the specified value. The specified value may be set as desired.

With the above-described process, it becomes possible to prevent an apparatus having unstable accessibility to the first-hop router from being selected as RP. A CPU load by PIM Register transmission can be mitigated which otherwise is increased by selecting an unstable apparatus as RP.

Figure 7:
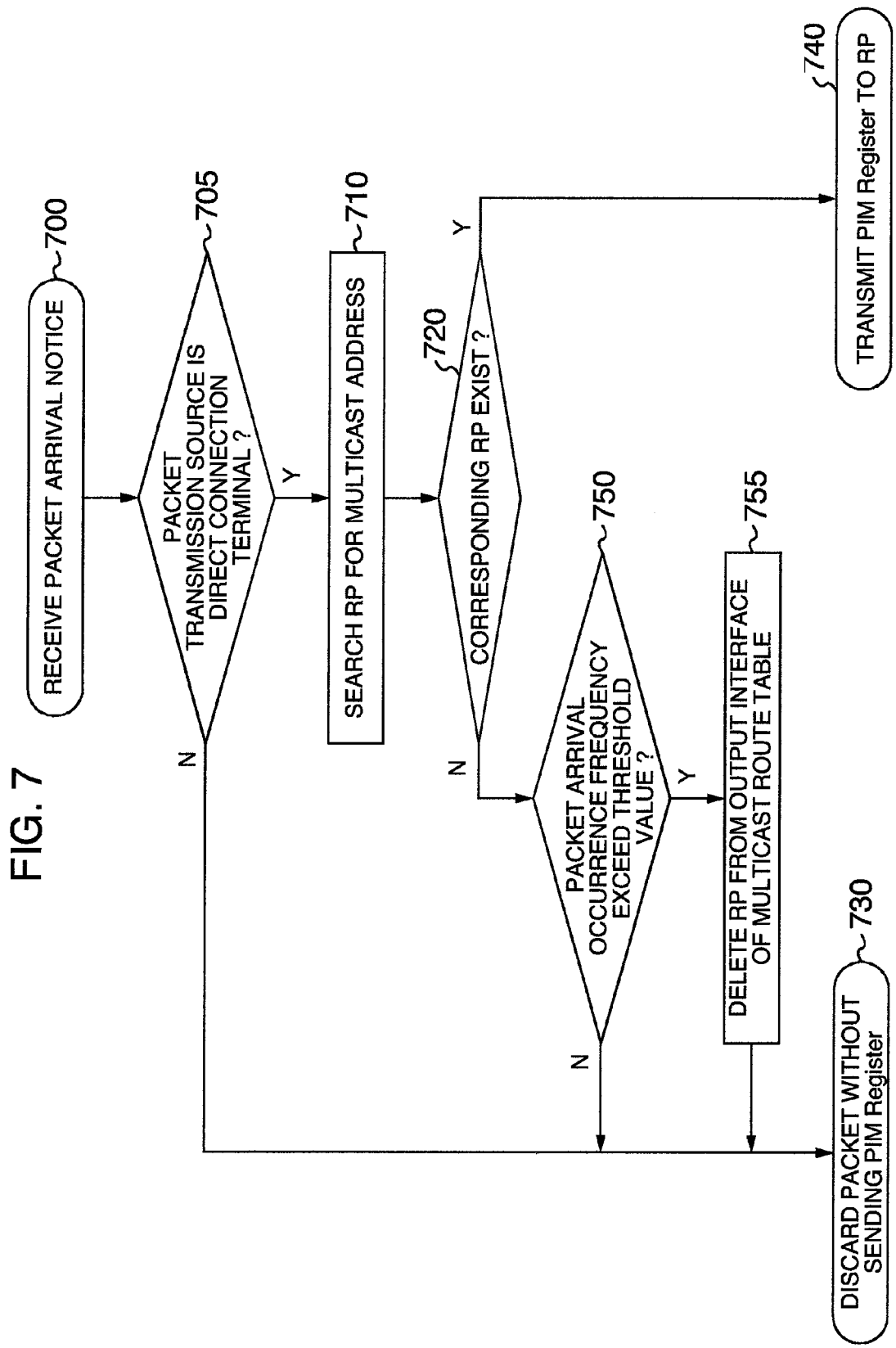
FIG. 7 is a flow chart illustrating a PIM Register transmission process using a negative cache mechanism.

The CPU load on the first-hop router 101 can further be mitigated by using also a negative cache mechanism. FIG. 7 is a flow chart illustrating a PIM Register transmission process when the negative cache mechanism is used. A different point of this process from the PIM Register transmission process shown in FIG. 3 is as follows. If a corresponding RP does not exist at Step 720, the PIM-SM route calculator 220 confirms whether an arrival occurrence frequency of received multicast packets exceeds a threshold value (Step 755). If the occurrent frequency exceeds the threshold value, RP is deleted from the output interface 454 of a route entry corresponding to the multicast address of the multicast packet in the multicast route table 450 (Step 755). After RP is deleted from the output interface 454, the multicast packet relay processor 210 does not notify an arrival of a multicast packet same as the subject multicast packet to the PIM-SM route calculator 220, and discards the received multicast packet. The CPU load generated by requesting the PIM-SM route calculator 220 to execute the PIM Register packet transmission process can therefore be mitigated.

With this process, it becomes possible to omit a notice to the PIM-SM route calculator 220 of an arrival of a multicast packet which requires transmission of a PIM Register packet to RP whose accessibility to the first-hop router is unstable. The CPU load generated by requesting the PIM-SM route calculator 220 to execute the PIM Register packet transmission process can therefore be mitigated.

If there is no stable RP and PIM Register transmission cannot be performed, it is not possible to perform multicast from a transmission terminal to reception terminal. However, this poses no practical problem because if RP is unstable, multicast communication becomes essentially unstable, regardless of presence/absence of the present invention. The CPU load on the first-hop router can be mitigated by incorporating the present invention, and influences upon communications other than multicast can be suppressed.

In this embodiment, although the algorithm shown in FIG. 5 is executed periodically, the algorithm shown in FIG. 5 may be executed after multicast packet reception starts, with similar advantages being ensured.

In this case, since accessibility to RP is not still confirmed immediately after a multicast packet is received at the first time, the value set to the response time-over number 404 for a corresponding RP address in the RP management table 222 is "0". Therefore, a PIM Register packet is transmitted by the process illustrated in the flow chart of FIG. 3. The first-hop router performs PIM register transmission to RP until accessibility confirmation of RP is completed.

After it is judged that accessibility to RP is unstable, the PIM-SM route processor 220 judges that a corresponding RP does not exist in the RP management table 222, and discards the multicast packet without PIM Register packet transmission. Alternatively, RP may be deleted from the output interface 454 of the multicast route table 450 by the process illustrated in the flow chart of FIG. 7. In this manner, it becomes possible to intercept PIM Register packet transmission to RP having unstable accessibility. Since accessibility confirmation of an unused RP is not performed, the CPU load can further be reduced.

Figure 8:
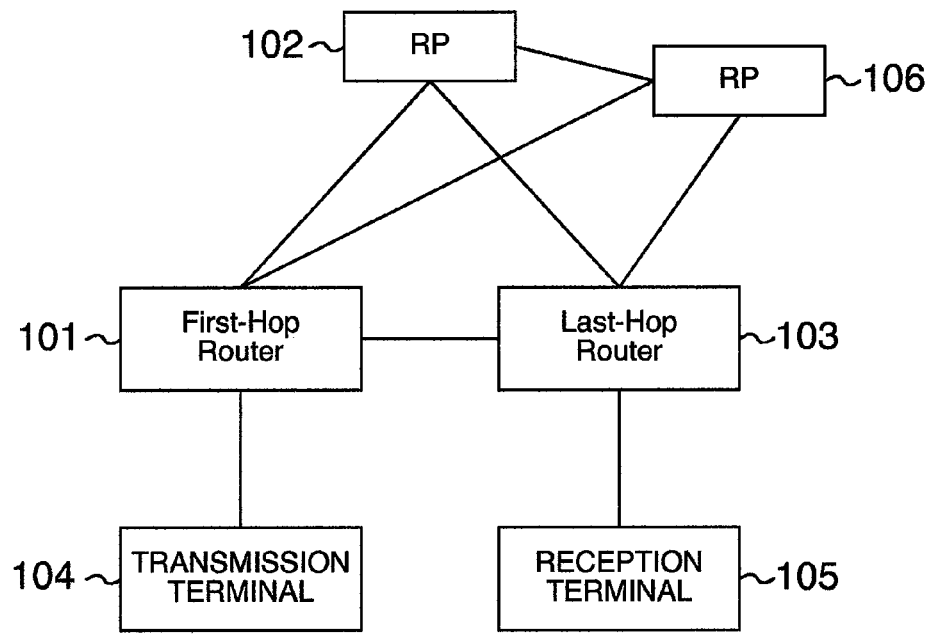
FIG. 8 is a diagram showing an example of the configuration of a PIM-SM multicast network having a plurality of RP's.

FIG. 8 is a diagram showing another example of the configuration of a PIM-SM multicast network applicable to the present invention. As different from the network shown in FIG. 1, there exist a plurality of RP's on a network, and when a failure occurs in one RP, the network is operated only by the other RP. Both the RP's relay a PIM Register packet transmitted from the first-hop router, by using Anycast-RP (refer to Non-patent Document 7: IETF, "Anycast-RP Using Protocol Independent Multicast (PIM)", RFC4610), to realize multicast relay to the last-hop router via the RP's. Also in this environment, there arises a problem that a PIM Register does not stop because RP switching will not be performed by Anycast technologies if RP becomes unstable.

The first-hop router 101 shown in FIG. 2 is applied to a first-hop router 101 and a last-hop router 103 shown in FIG. 8, the first-hop router transmits a PIM Register packet by the process illustrated in the flow chart of FIG. 3, and the response time-over number field of the RP management table shown in FIG. 4 is updated by the process illustrated in the flow chart of FIG. 5. Although Anycast-RP is used in this embodiment, it is assumed that each packet relay apparatus recognizes not an Anycast-RP address but an address of each RP in accordance with settings of PIM-SM. This is because since the same IP address is generally set to a plurality of RP's as a virtual IP address for Anycast-RP, each RP cannot be distinguished.

Figure 9:
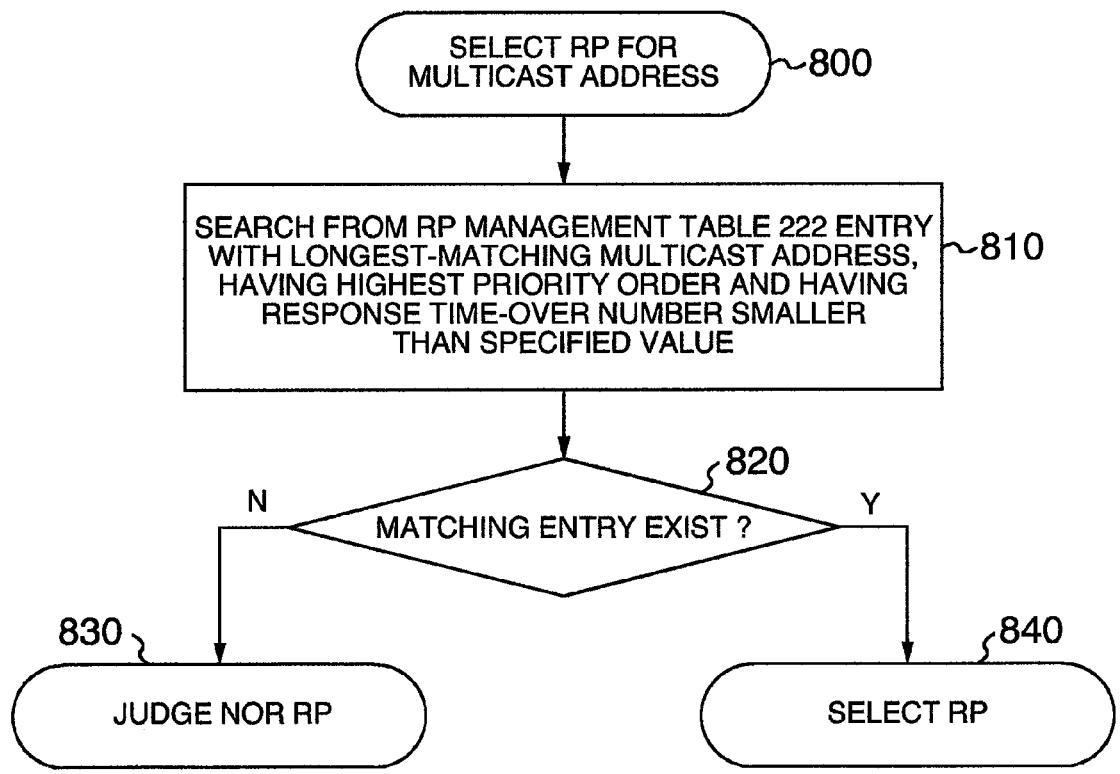
FIG. 9 is a flow chart illustrating an RP selection process of selecting an RP from a plurality of RP's.

In this case, the first-hop router and last-hop router select RP by the process illustrated in the flow chart shown in not FIG. 6 but FIG. 9. As different from the flow chart of FIG. 6, the flow chart of FIG. 9 considers the response time-over number when a first RP is selected (Step 810). By considering first the response time-over number, a best RP among stable RP's can be selected when a best RP becomes unstable.

It is assumed that the last-hop router 103 selects RP 106 and the first-hop router 101 selects RP 102, by the process illustrated in the flow chart shown in FIG. 9. In this case, the first-hop router 101 encapsulates a multicast packet received from the reception terminal 104 into a PIM Register packet and transmits it to RP 102. RP 102 relays the PIM Register packet to RP 106 in accordance with Anycast-RP. Since the last-hop router 103 transmitted a group join request to RP 106, RP 106 transmits the PIM Register packet received from RP 102 to the last-hop router 103.

With this process, multicast relay can be performed without selecting an unstable RP, even in a state that there are a plurality of RP's.

In the embodiment described above, reachability to RP is confirmed by transmitting an accessibility confirmation packet from the first-hop router to RP. Non-reachability to RP may be confirmed by other methods.

For example, reachability to RP may be judged bad, if an occurrence frequency of physical line errors on an output line from the first-hop router to RP exceeds a predetermined value. An occurrence of a physical line error may be detected by providing each of the lines 201 to 203 shown in FIG. 2 with an error counter generally equipped to a router or the like, and checking a count of the error counter. In this case, an occurrence frequency of physical line errors is input to the field of the response time-over number 404 of the table shown in FIG. 4, and the process illustrated in FIG. 6 or 9 is executed. It is therefore possible to prevent the first-hop router from selecting RP whose accessibility is unstable.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A relay apparatus for performing multicast communications in PIM-SM (Protocol Independent Multicast Sparse-Mode), the relay apparatus being connected to at least one RP (Rendezvous-Point) via a network and accommodating a transmission terminal of a multicast packet, comprising:
   a line for receiving a multicast packet from said transmission terminal;
   a multicast packet relay processor for searching a route of said multicast packet in accordance with a multicast address of said received multicast packet;
   a memory for storing an RP management table storing a correspondence between a multicast address and an RP address;
   an RP reachability monitor for monitoring reachability by transmitting a ping packet to said RP and storing monitor results RP in said RP management table in said memory; and
   a PIM-SM route calculator for searching from said RP management table an RP address corresponding to the multicast address of said multicast packet received at said line, judging a monitor result of reachability of the searched RP address, and in accordance with the judgement, encapsulating said multicast packet into a unicast packet and transmitting said unicast packet to said RP having said searched RP address,
   wherein said RP reachability monitor transmits periodically said ping packet.

2. The relay apparatus according to claim 1, wherein said PIM-SM route calculator does not perform said encapsulating if it is judged that the monitor result of reachability of said searched RP address is outside a predetermined range.

3. The relay apparatus according to claim 1, wherein said RP reachability monitor transmits said ping packet to said RP in accordance with an RP address managed by said RP management table in said memory.

4. The relay apparatus according to claim 1, wherein the monitor result to be stored in said RP management table by said RP reachability monitor includes at least a counting result of the number of times when a response time to said ping packet exceeds a predetermined time.

5. The relay apparatus according to claim 1, wherein said RP reachable monitor judges at least whether a response time to said ping packet is shorter than a specified time, and selects either the number of over-time times of said response time is incremented or the number of over-time times of said response time is set to 0, as the monitor result to be stored in said RP management table.

6. The relay apparatus according to claim 4, wherein said PIM-SM route calculator confirms whether said number is smaller than a threshold value, performs said encapsulating if the number is smaller than said threshold value, and discards said received multicast packet if the number is not smaller than said threshold value.

7. The relay apparatus according to claim 6, wherein:
   said PIM-SM route calculator notifies said multicast packet relay processor of an effect that discarding said multicast packet was performed over a predetermined number; and
   said multicast packet relay processor discards a multicast packet having the same multicast address as the multicast packet associated with said notification.

8. The relay apparatus according to claim 1, wherein said RP reachability monitor starts transmitting said ping packet to said RP after said line receives said multicast packet.

9. The relay apparatus according to claim 6, wherein:
   said memory stores a multicast route table defining an output interface corresponding to the multicast address; and
   said PIM-SM route calculator deletes said RP from the output interface of said multicast route table, when discarding said multicast packet is performed over a predetermined number.

* * * * *